(12) United States Patent  
Jensen (10) Patent No.: US 6,498,604 B1  
(45) Date of Patent: Dec. 24, 2002

(54) INPUT DEVICE FOR A COMPUTER

(75) Inventor: Jørgen Korsgaard Jensen, Kolding (DK)

(73) Assignee: Kanitech A/S, Kolding (DK)

( * ) Notice: Subject to any disclaimer, the term of this patent is extended or adjusted under 35 U.S.C. 154(b) by 0 days.

(21) Appl. No.: 09/315,664

(22) Filed: May 20, 1999

(30) Foreign Application Priority Data

| Feb. 12, 1997 | (DK) | 0155/97 |
| Apr. 21, 1997 | (DK) | 0442/97 |
| Jul. 4, 1997 | (DK) | 0798/97 |

(51) Int. Cl.$^7$ .................................................. G09G 5/00
(52) U.S. Cl. ........................ 345/179; 345/166; 178/18.01
(58) Field of Search ........................ 345/179, 166; 178/18.01

(56) References Cited

U.S. PATENT DOCUMENTS

| 4,272,676 | A | * | 6/1981 | Dieulesaint et al. ........ 250/221 |
| 5,027,115 | A | * | 6/1991 | Sato et al. .................... 341/13 |
| 5,288,993 | A | | 2/1994 | Bidiville et al. ............ 250/221 |
| 5,434,594 | A | | 7/1995 | Martinelli et al. .......... 345/163 |
| RE35,016 | E | * | 8/1995 | Gullman et al. ........ 73/862.041 |
| 5,463,387 | A | * | 10/1995 | Kato .......................... 205/229 |
| 5,793,357 | A | * | 8/1998 | Ivey et al. .................. 345/166 |
| 5,850,085 | A | * | 12/1998 | Tano et al. ............... 178/18.01 |
| 6,081,261 | A | * | 6/2000 | Wolff et al. ................. 345/179 |

FOREIGN PATENT DOCUMENTS

| DE | 3900622 | 9/1989 |
| EP | 0 671 007 | 4/1997 |
| JP | 90/16328 | 1/1997 |
| WO | WO 94/22071 | 9/1994 |

OTHER PUBLICATIONS

Comerford, "Magneto–Mechanical 'Mouse' (Fast Cursor Positioning Device)" *IBM Technical Disclosure Bulletin*, vol. 27, No. 7A, pp. 3783–3784, Dec. 1984.

Anonymous, "Optical Pen Mouse", *Xerox Disclosure Journal*, vol. 10, No. 3, pp. 123–125, Jun. 1985.

* cited by examiner

*Primary Examiner*—Richard Hjerpe
*Assistant Examiner*—Kevin M. Nguyen
(74) *Attorney, Agent, or Firm*—Merchant & Gould P.C.

(57) ABSTRACT

The present invention provides an input device for positioning a cursor on a computer screen by movement of a ball whose rotary movements are transformed into electronic signals, which is unique in that the angular rotations of the ball can be detected by an optical detection means by use of substantively coherent light in such a manner that the rotation of the ball is converted into data values with respect to an x-axis and a y-axis, said axes being preferably perpendicular to each other. This provides a compact detecting device which is suitable for the construction of a computer mouse with the shape of a ball-point pen.

26 Claims, 7 Drawing Sheets

INPUT DEVICE FOR A COMPUTER

The present invention relates to an input device for positioning a cursor on a computer screen by movement of a ball relative to a substrate, and that these rotary movements of the ball are transformed into electronic signals.

The generally known input devices, such as computer mice, for the operation of a computer have certain drawbacks. The computer mouse requires some space available within the range of the computer user. Another requirement for the substrate of the mouse is that it must be a firm and plane as well as essentially horizontal substrate of a certain extent to enable the user to orient the screen projection of the mouse relative to the entire extent of the computer screen. It may sometimes be difficult or even impossible to place the computer such that the space required for the operation of the mouse is always available. Moreover, the known computer mouse solutions frequently give rise to pain in fingers and wrists after extended use.

Several attempts have been made to overcome these drawbacks, inter alia with several proposals for constructing the computer mouse as a ball-point pen. Such a "computer pen" will be extremely convenient, easy and more precise to operate, it being possible to utilize the fact that the fine motor function of the fingers is considerably better developed than that of the arms. Further, no strict requirements are made with respect to the substrate on which the mouse is used.

A computer mouse constructed as a ball-point pen will also be able to expand the general use of computers.

Thus, it is conceivable that the future use of computers will inter alia comprise "hand-written" letters or memos in electronic form. It will hereby be possible to impart a personal touch to the user of the computer, and to reduce the use of the keyboard completely or partly.

However, it has been found that the traditional embodiment of the arrangement for recording and transforming the movements of the ball into electrical signals requires a good deal of space particularly around the ball, which sets a limit to how small dimensions a pen-shaped computer mouse may be given. It is common to the know structures of "computer pens" that the external dimensions of the pen itself and of the ball are larger, and the computer pen hereby becomes more unhandy than ordinary ball-point pens.

The German Auslegeschrift No. DE 39 00 622 A1 describes a pen-shaped computer mouse, in which the recording of the movements of the ball is performed in that two rollers are in constant contact with the ball. The rollers rotate as a consequence of the rotation of the ball. A sensor unit is provided in connection with each of the rollers and records the rotation of the roller. The two rollers are arranged such that the movements of the ball in two directions relative to an x-axis and a y-axis may be recorded. This solution, which requires much space, resembles the normal rotation recording of the ball in an ordinary "box-shaped" computer mouse, but with the difference that space is just available behind the ball in the ball-point pen structure. Thus, the tubular computer mouse according to DE-39 00 622 A1 cannot be manufactured with a very small cross-sectional diameter, as the tube, directly behind the ball, must be able to accommodate the entire space-requiring recording arrangement.

Another embodiment of a pen-shaped structure of a computer mouse is moreover known from U.S. Pat. No. 5,434,594. Here, the recording arrangement and the ball suspension are made in the same manner as in an ordinary "box-shaped" mouse. The result is a computer mouse of such a structure that only to a limited extent can it be said to provide the expected advantages which are desired in connection with a pen-shaped computer mouse.

EP-A-0 413 606 describes a combined ball-point pen and computer mouse. It operates in that a flow meter is arranged directly above the ball, said flow meter measure the direction in which the ink moves as a consequence of the movement of the ball. This solution does not appear to be very reliable and only works as long as ink is present in the pen.

From U.S. Pat. No. 5,288,993 a track-ball device is known in which the ball is provided with randomly distributed speckles in contrasting colors, and light-sensitive sensor means, so that the movement of the ball can be detected. This detection concept takes up a considerable amount of space underneath and beside the ball and is for this reason alone not suitable for use in a pen-type solution. Furthermore, this device requires a ball of a diameter of at least 5 mm.

From WO94/22071 another optical solution is known. This device comprises photo-coupler means that can detect the movement of the ball of a golf ball type that is provided with concave reflectors (dimples). This device also takes up a considerable amount of space around the ball and requires a relatively large diameter that makes the solution unsuitable for a proper pen-type solution.

A similar solution is also shown from Xerox Disclosure Journal, Vol. 10, no. 3 pages 123–125, where a ball-point pen having a ball with dots in a contrast colour is described. The angular rotation of this ball is detected by use of LEDs or incandescent lamps. The 'golf ball' type solution is also mentioned in this disclosure.

Accordingly, the object of the invention is to provide an input device for a computer with a recording arrangement which requires considerably less space than the known solutions, thereby making it possible to construct a pen-shaped computer mouse in dimensions corresponding to a ball-point pen or similar writing utensil.

The invention comprises an input device of the introductory mentioned kind, wherein, said optical detection means comprising at leas. one source of substantially coherent electromagnetic radiation, at least one lens and one or more detectors.

This provides a recording arrangement for an input device which just contains few spacious components, and thus is advantageous in terms of space, as he optical detection means may be arranged at the rear side of the ball and only take up little room. This makes this principle suitable for the design of a computer pen, as it may be manufactured with a relatively small cross-sectional diameter since the detection means can be built with an elongated shape.

In a first preferred embodiment of the invention the optical detection means is adapted to detect the movement of the speckle pattern generated by the electromagnetic radiation scattered from the granular structure of the surface of the ball.

This is a particular simple way to carry out the detection, as the detection means according to this embodiment of the invention does not set out any special requirements to the surface of the ball.

The speckles arise when coherent light is scattered off the surface and made to interfere, constructively or destructively, as it propagates in free space. At a distance from the illuminated surface a strong intensity modulation is observed, which is usually named a "speckle pattern". The coherent light is provided by a laser preferably of a VCSEL-type (VCSEL: Vertical Cavity Surface Emitting Laser), which is advantageous in that it has a very low electrical power consumption and a lower beam divergence.

The ball of a computer input device according to this first embodiment of the invention can be designed with a relatively very small diameter, as no special surface structure is required. A method of determining angular rotation of a cylindrical object by illuminating a spot of the object surface with coherent light is in general known from EP-B1-0 671 007.

In the first preferred embodiment the optical detection means comprises a first and a second sets of detectors and a common laser source, and each set of detectors are adapted to detect the angular rotation in a first and a second direction. In addition, comprises each set of detectors comprises two detectors that are arranged in such a way that a speckle pattern arising from the surface of the ball successively is detected by a first detector and then by a second detector by an angular rotation of the ball. Also, the transit time between the detected speckles can be determined by electronic means. Hereby a reliable measurement of the angular rotation of the ball in two directions can be carried out. Alternatively, the detectors could be arranged as a quad detector or similar detector arrays.

In an alternative embodiment, the surface of the ball is formed with optically detectable markings for the optical detection of movement. The reflection of the electromagnetic radiation or laser beam(s) from the surface is detected by the detectors and/or the CCD cameras, following which these signals are converted in an electronic signal processing unit into an electronic signal giving the direction in which the ball rotates. Reading of the markings is also performed in an optical system, which basically resembles the known code call systems from the compact disc technology and other forms of optical measuring devices.

The detectors according to this embodiment could also be arranged as quad detectors or as an array of detectors.

The optically detectable markings may advantageously be embedded in an information layer, either direct on the surface of the ball or on two shafts which are oriented preferably perpendicularly to each other, and to which the rotations of the ball are transferred, said marking layer being provided on these shafts. To protect the information layer, a preferably transparent protection layer may finally be applied to the information layer, as is known e.g. from compact discs.

In a preferred embodiment of the invention, the device is constructed as a computer pen comprising a tubular housing in which the ball is rotatably arranged at one end. Further, at the opposite end the computer pen may be connected to a computer either in the form of a cable connection or a wireless connection. In this embodiment, the pen will be provided with a transmitter and a power supply, such as a normal rechargeable battery. Keys may be arranged on the side of the substantively tubular housing to generate additional control signals for the connected computer. These keys as well as the substantively tubular housing are shaped and arranged in an ergonomically correct configuration.

In an embodiment, it is moreover conceivable to split the laser beam from the laser into two or more beams. As a supplement to the detectors or in substitution for one or more of the detectors, the detection means may moreover comprise one or more CCD cameras.

The electronic signal processing unit may be an integrated part of the pen, alternatively the optical signals just processed partly in the pen, following which the final signal processing is performed by an electronic signal processing unit which is incorporated in the transmission receiver in or attached to the computer.

The optically detectable markings may advantageously be embedded in an information layer, either directly on the surface of the ball or on two shafts which are oriented preferably perpendicularly to each other, and to which the rotations of the ball are transferred, said marking layer could be provided on these shafts. To protect the information layer, a preferably transparent protection layer may finally be applied to the information layer, as is known e.g. from compact discs.

The input device could further comprise a battery and associated battery capacity measuring means that can generate signals displaying the remaining capacity and transmit these signals to the computer. This means, that the user will have the possibility to monitor the status of the input device during use.

The invention will be described more fully below with reference to the accompanying drawing, in which.

Figure 1:
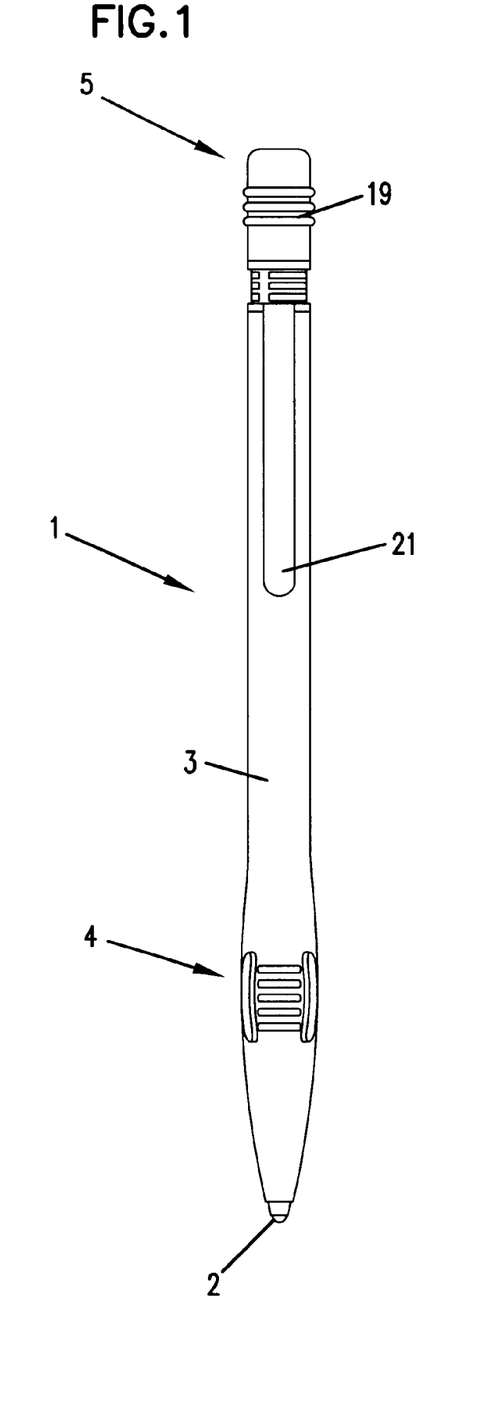
FIG. 1 is a view of a computer pen according to a preferred embodiment of an input device according to the invention.

FIG. 1 shows an input device according to the invention constructed as a computer pen 1, which consists of a ball 2 mounted at the lower end of the substantially tubular main part 3 of the pen and transmission means 5 at the opposite end for transmitting signals from the pen 1 to a computer (not shown). The lower part of the main part 3 mounts a key unit 4 comprising two buttons so arranged on the pen 1 as to be aligned with two fingers when the user holds the pen 1 in his hand.

In the embodiment shown, the main part 3 is formed with a generally circular cross-section, but may of course have any cross-sectional shape, depending on the desired design.

Figure 4:
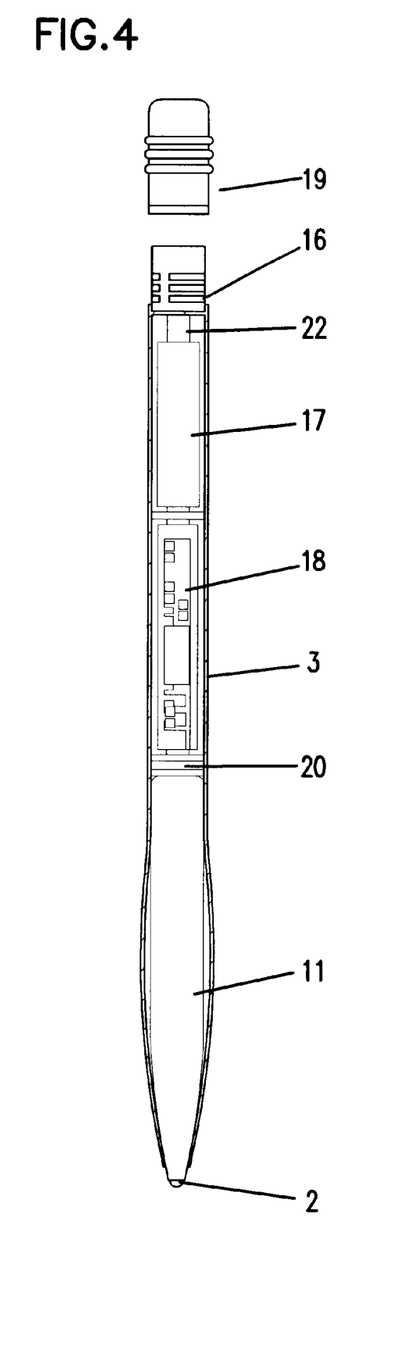
FIG. 4 is a view of the internal structure of a computer pen according to a preferred embodiment of an input desire according to the invention.

As shown in FIG. 4, optical detection means 11 are arranged above the ball 2 inside the main part 3 to record the rotations of the ball in two directions, with which the movements of the pen in the X- and Y-directions via the rotations of the ball may be converted into electrical signals which are transmitted via the transmission means 5 to the computer.

In one embodiment of the invention, the ball is formed with an information layer having optically readable markings which are read by the optical detection means 11 and are converted into electronic position signals/position change signals. The detection means comprises a light source of preferably laser light, one or more reflectors, lenses and detectors.

Figure 2:
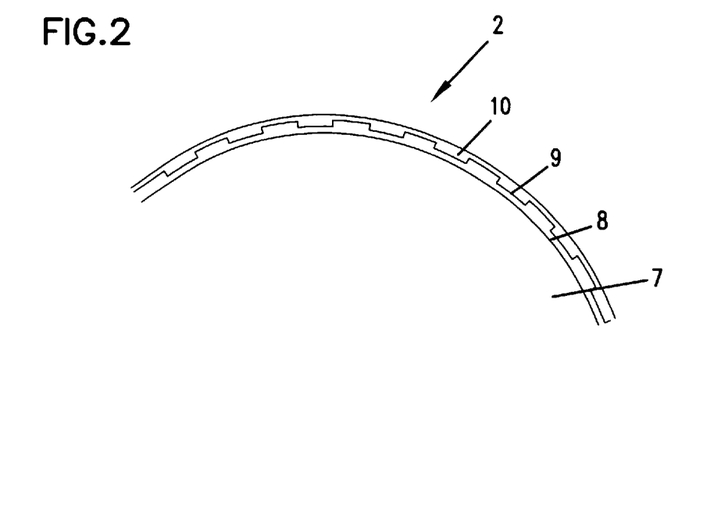
FIG. 2 is a basic detailed view of a bail according to an embodiment formed with markings on the surface.

As shown in FIG. 2, the ball 2 consists of a core 7. An information layer 8 comprising markings is provided on the surface of the core. The surface of the information layer has applied thereto an optically reflectable layer 9. The reflection layer 9 is topped by a protection layer 10 which may be a transparent plastics or rubber material.

Figure 3:
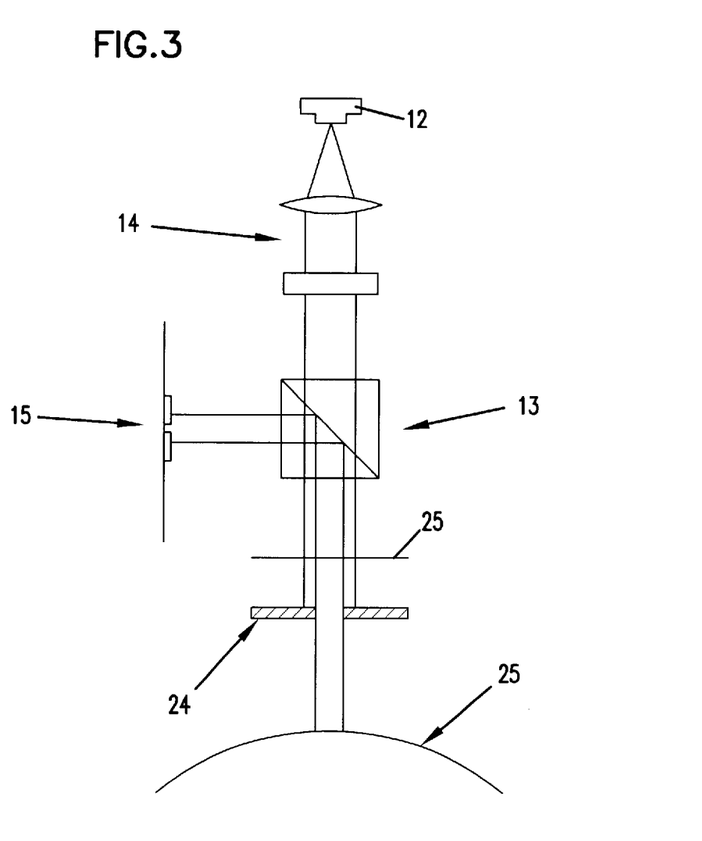
FIG. 3 is a schematic view of the optical detection means according to one embodiment of the invention.

The optical detection means 11 to record he rotations of the ball and to transform these into electronic signals operates by the use of laser light in an advantageous embodiment, as shown in FIG. 3. A laser 12 sends light through a system of lenses 14 and detectors 15 and also reflectors, including a polarising beam splitter 13 and preferably also a quarter wave plate 25. The laser light is reflected by the reflection layer 9 on the ball 2 in different depths, depending on how it falls on the reflection layer 9 with respect to the markings in the information layer 8. The lenses 14 and the collimating hole 24 ensure that the light is correctly focused with respect to the surface of the ball. The detectors 15 communicate with an electronic signal processing unit which processes the detected signals, which are then passed further on to the computer.

The means of transmitting the electronic signals from the computer pen to the computer may be a wire 5, or alternatively a wireless connection comprising a receiver unit on the computer and a transmitter unit on the pen, as shown in FIGS. 1 and 4.

FIG. 1 shows a computer pen constructed as a ball-point pen. As will appear from the FIG. 1, the ball 2 is retracted into the housing 3 when the switch 19 interrupts the signal transmission from the pen to the associated computer. The pen is provided with a clip 21 so that it may stored in a practical manner in a pocket or the like of a user when the pen is not in use.

FIG. 4 shows the structure of the pen. The top of the optical detection means is in contact with a pressure sensitivity meter 20 at one or both of its ends. The pressure on the ball and the size of the bail Pressure may be detected hereby. The pen may then be used for graphic input to the computer depending on the installed software application. This allows the pen to be used for the click function by being pressed against the substrate, so that the pressure sensitivity meter 20 may serve as an alternative or a supplement to the slick keys 4, and the pen may also be used for generating graphics, it being possible to convert the ball pressed into a signal for the line thickness used in the drawing. A computer pen according to this embodiment of the invention may thus be used for generating "hand-written" electronic messages or the like, just as other forms of drawing will be possible. The computer pen according to this embodiment of the invention may thus be used in connection with computer-based tasks like a ball-point pen is used today for paper-based tasks.

A pressure sensitivity meter 20 is preferably implemented as a conductive rubber material. On one side of this rubber disc a permanent electrical contact is established, whilst the other side is brought into electrical contact when a ball pressure is applied. The rubber disc is shaped in such a way that the surface of contact is increased by an increase in the ball pressure. Alternatively, the pressure sensitivity meter 20 could be provided as a piezo-electric or a strain gauge solution.

The structure of the pen moreover comprises a processor unit 18 which is integrated in the pen in the embodiment shown. Alternatively, the processor unit 18 may be integrated in the transmission receiver in or on the computer in which the detected signals from the optical detection means 11 and the pressure sensitivity meter 20, if this is installed, are converted into electronic signals, which are transmitted wirelessly to the computer by means of an infrared or radio transmission unit. The wireless connection will be based on radio frequency transmission in the preferred embodiment. An exchangeable and/or rechargeable battery 17, such as a lithium battery, s arranged in connection with the processor 18 as a power supply for the electronic units 11, 18, 22 in he pen.

Figure 5:
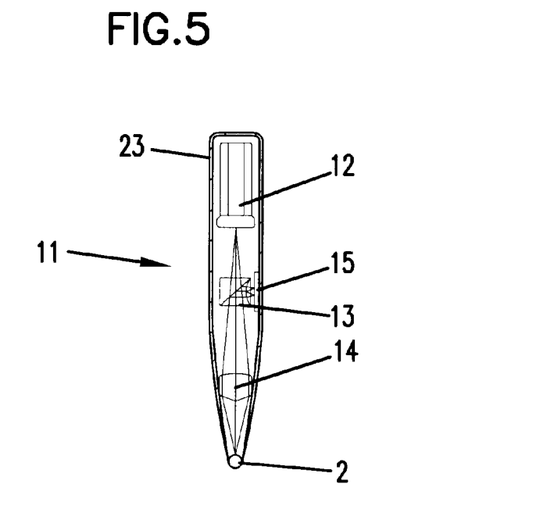
FIG. 5 is a detailed view of the optical detection means of the computer pen in FIGS. 1 and 5, FIGS. 6a and 6b are a principal view of the detection means detection the angular rotation of the ball having a "natural" surface.

FIG. 5 shows the structure of the optical detection means 11. The structure of this has previously been describes in connection with FIG. 3. As shown in FIG. 5, the detection means 11 comprises a housing 23 which accommodates a light source 12, a system of lenses, such as a double prism unit 13, a scanning objective 14 as a reflector, and a ball 2 coated with an information layer, mounted in the housing 23.

One or more accelerometers may be incorporated in the pen. The accelerometer measures the acceleration of the pen in one, two or three dimensions. The combination of the other possible functions of the pen means that in the writing functions of the pen it is possible to obtain a writing function which is completely equal to an ordinary ball-point pen, etc.

When the ball head of the pen is moved against a substrate, thereby writing on the computer, the pressure sensitivity meter 20 will always exhibit a certain pressure. When the ball head of the pen is lifted from the substrate, e.g. when the pen is lifted to start a new word, letter, drawing, etc., it is typically just desired to have the cursor moved to the new start position without this producing a line on the computer screen/document.

The measurement of the acceleration of the pen is converted in an electronic signal processing unit, whereby the movement of the pen may be detected with respect to an X-axis and a Y-axis.

The pen may then be used in a writing and/or drawing software program so that when the ball head is activated against a substrate in a movement, this movement will be converted into a recording of the movement of the cursor with respect to an X-axis and a Y-axis. The pressure sensitivity meter will simultaneously record a certain pressure on the ball head. The combinations of these two measurements e.g. cause the movement to be recorded as a line, letter or other electronic "written" sign. When the pen is lifted from the substrate to move the cursor to a new starting point for the next line, letter or other electronic "written" sign, the pressure on the pressure sensitivity meter will drop to 0. When the pressure has dropped to 0, the accelerometer or accelerometers take over the detection of the movement of the pen with respect to the X- and Y-axes, and the cursor will then be moved correspondingly with respect to the X- and Y-axes. Relative to the movement via the rotation of the ball, the movement based on the detections of the accelerometer(s) results in no electronic "written" marking on the screen (line, sign, etc.).

FIGS. 6a, 6b and 7–10 show various details of the detection means according to a preferred embodiment of the invention, where the detection means are adapted to detect the angular rotations of a ball without any special markings deposited on its surface.

Figure 6A:
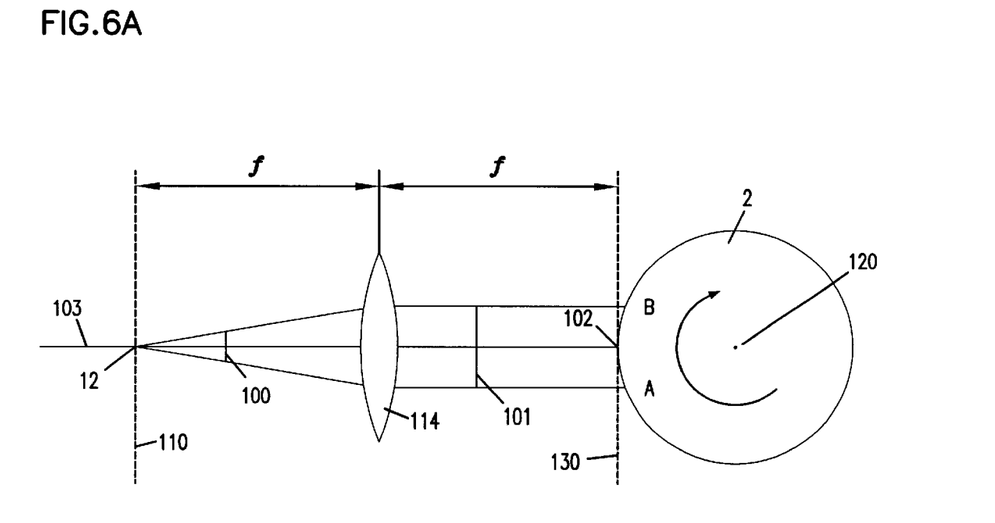

In FIG. 6a a spherical wave 100 of coherent light diverges from a laser point source 12, positioned in the Fourier-plane 110 of a converging lens 114 having a focal length f. The spherical wave 100 is collimated to a plane wave 101 which propagates towards the surface 102 of the ball 2. The surface 102 is positioned approximately in the Fourier-plane 130 of the converging lens 114.

Figure 6B:
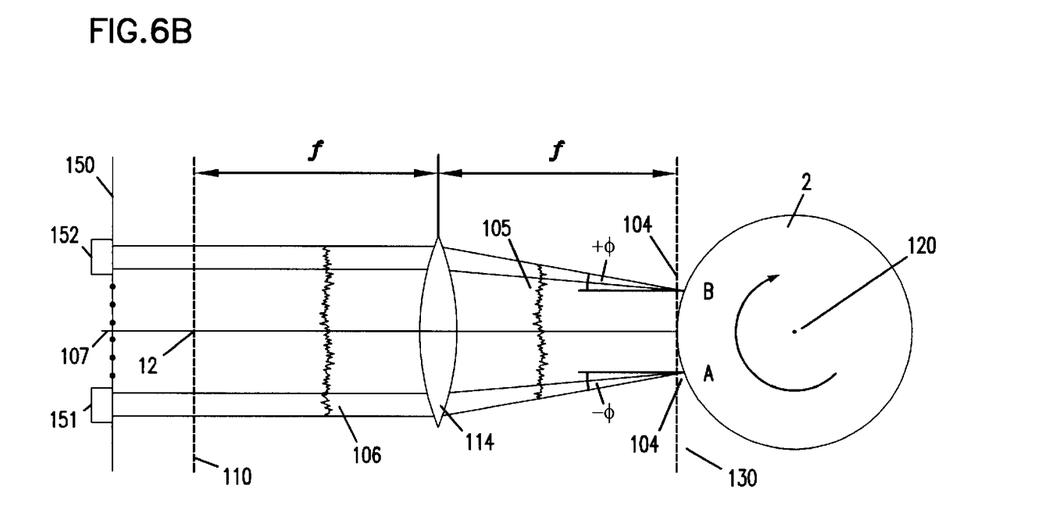

The plane wave 101 and the surface element 104 in position A (FIG. 6b) provide a spherically scattered reflection 105 with its normal in a, angle $-\Phi$ with respect to the normal of the plane wave 101. This occurs when the surface element 104 is orientated in such a way that the angle of incidence equals the angle of reflection. Following rotating the ball 2 an angle Φ, the same surface element 104 which is now in position B in relation to the plane wave 101, provides a new reflection in an angle +Φ. In total, a rotation of Φ degrees of the ball provides a rotation of 2Φ of the reflection. FIG. 6b further indicates the reflections falling within the solid angles of the detectors 151 and 152 positioned in the detector plane 150 outside the Fourier-plane 110.

In FIG. 6b showing a cross-sectional view of a preferred embodiment, the plane wave 101 is reflected and diverted from the rotating surface 102 producing a reflected complex wave pattern 105 composed of components providing speckles by constructive and destructive interference between scattered specular and non-specular reflections. The reflected complex wave pattern 105 is Fourier-transformed to a complex transformed wave pattern 106 by the converting lens 114 producing subjective speckles 107 which move linearly in the detector plane 150. The subjective speckles 107 are detected by first a first detector 151 and a second detector 152. The first detector 151 has a solid angle ΔΦ and is positioned in the detector plane 150 at an angular distance −Φ to the optical axis 103. The second detector 152, preferably similar to the first detector 151, is positioned at an angle +Φ, also in the detector plane 150. The detector signals of the two detectors 151 and 152 are cross-correlated electronically by methods known in the art, and by tracing the time lag which provides maximum cross-correlation between the two detector signals, the transit time of the subjective speckles is provided and converted to a measurement of the rate of rotation of the ball 2.

Figure 7:
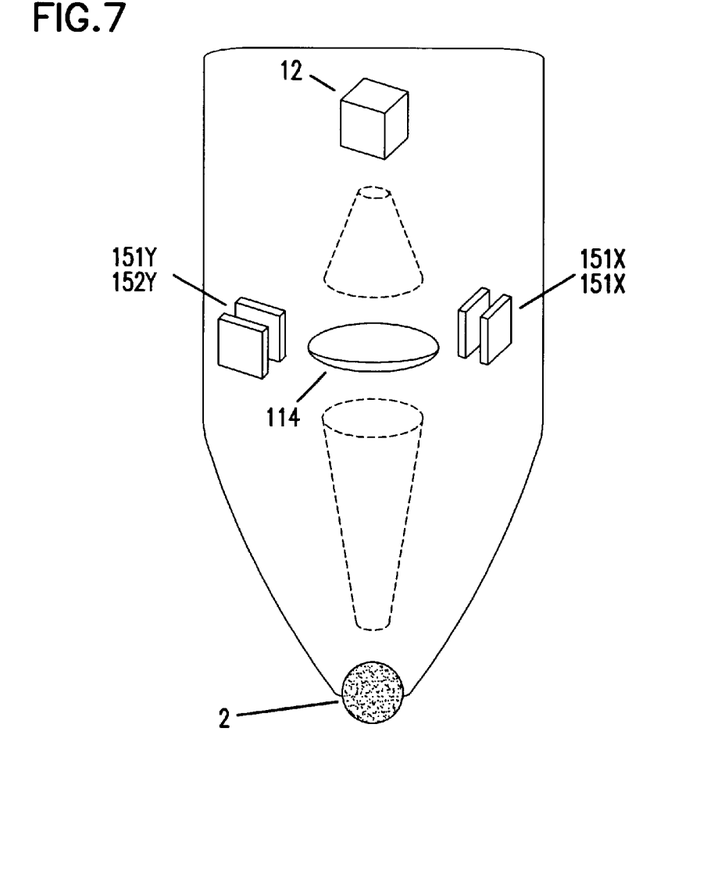
FIG. 7 is a detailed view of the optical detection means according to the preferred embodiment of the invention.

FIG. 7 is a view of the optical implementation of the detection means according to the preferred embodiment for detecting the rotation of the ball. As shown in FIG. 7, the diverging beam from the laser source 12, with a wavelength preferably in the region of 680 nm to 860 nm is collected by a lens 114 and transformed into collimated or a focused beam illuminating the surface of the ball 2. Speckles are formed at a distance of approximately 20 mm from the ball, where the lens 114 and the detectors $151_x$, $152_x$; $151_y$, $152_y$ are arranged. These speckles will display a translation in the x- and y-direction according to the rotation of the ball. The displacement of the speckles is proportional to the angular rotation of the ball 2.

Figure 8:
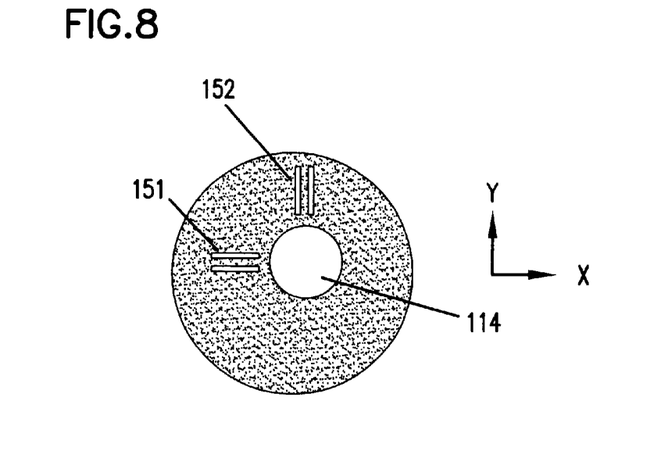
FIG. 8 is a schematic top view of detectors in relation to the ball.

FIG. 8 is a cross-sectional principal view showing the arrangement of the detectors 151, 152 and the lens 114 in relation to the ball 2. In a preferred implementation the point of focus on the surface of the ball, contrary to the illustration in FIG. 8, is off-set from the centre of the ball, so that the optical detection axis 103 is off-set from the axis of the computer pen. This is in order to prepare the computer pen with a gross compensation for tilting of the pen when using it as a normal writing utensil. This tilting will otherwise cause some erroneous directional detection.

As the ball rotates in a given direction, the speckles will be transferred from one detector to the next in the relevant group of detectors 151, 152. A way of determining the direction in which the speckles moves, and which is corresponding to the direction of rotation of the ball, is by observing the value of the one detector signal when the second detector 152 has an increasing signal. A large detector signal in the first detector 151 while the second detector 15 has an increasing signal strength is a result of a movement from the first detector 151 to the second detector 152.

Figure 9:
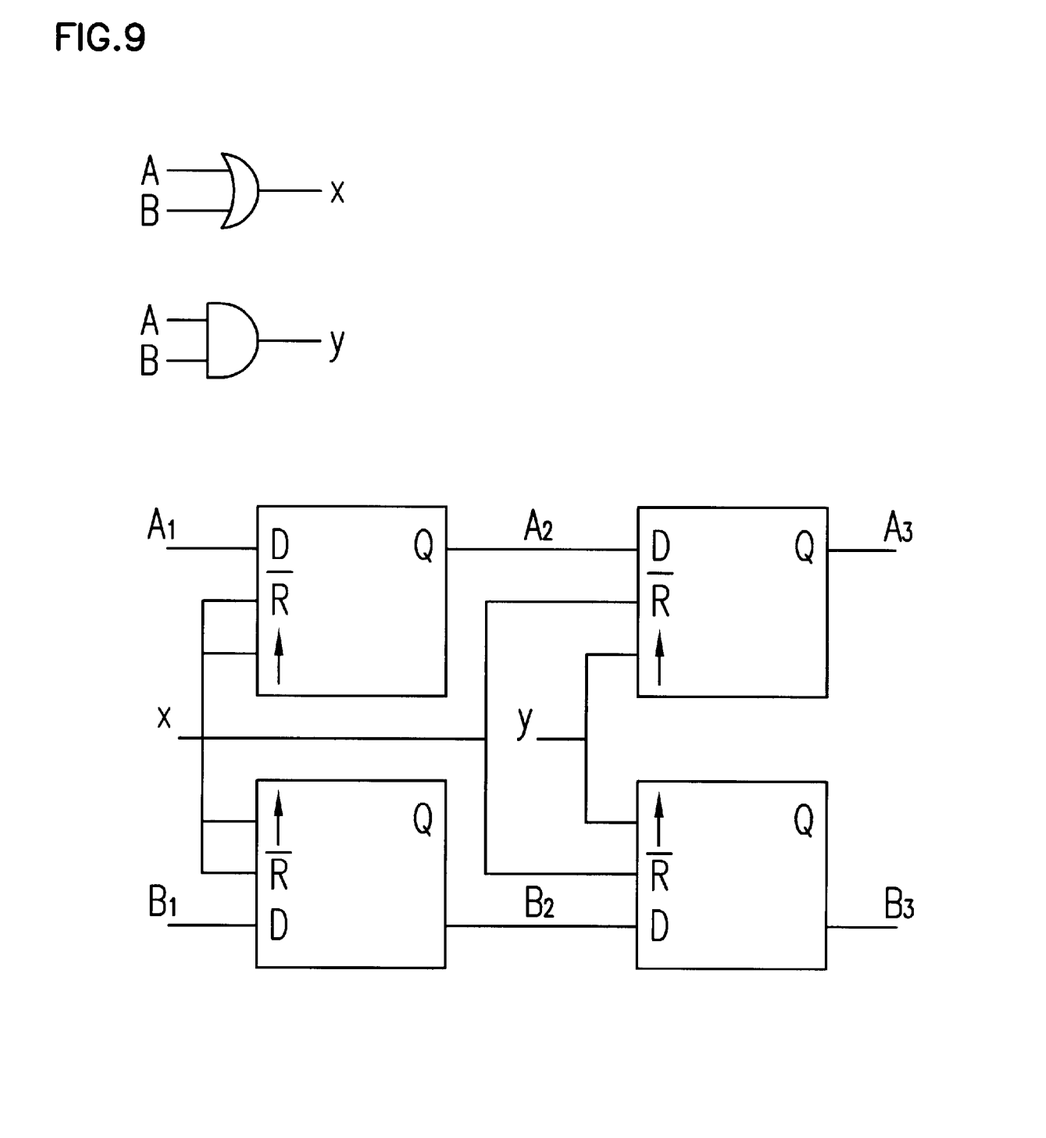
FIG. 9 is a digital processing scheme for determination of the amount of angular rotation by the detection means according to a first embodiment of the invention.
Figure 10:
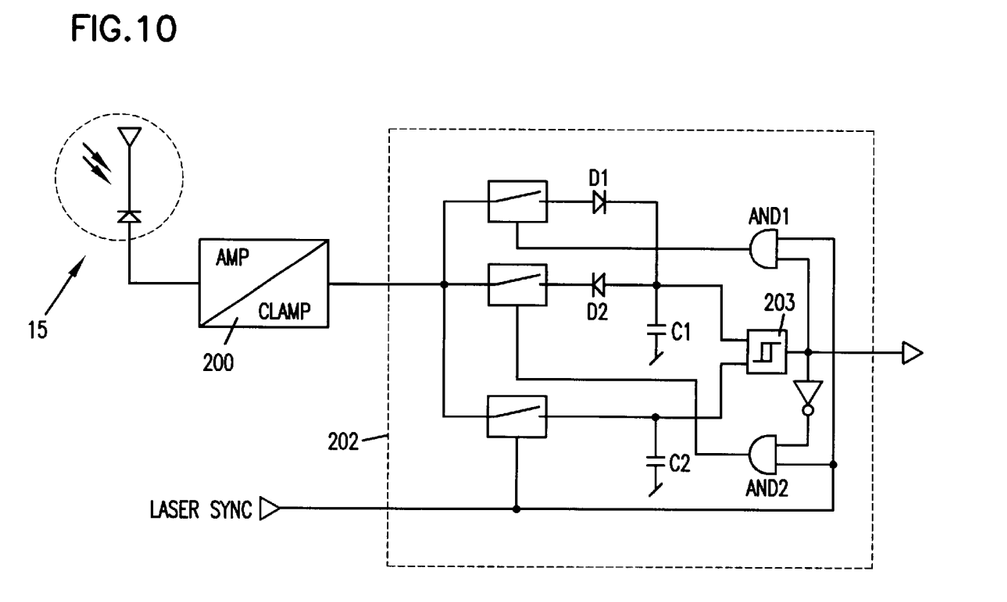
FIG. 10 is another part of the processing scheme for determination of the amount of angular rotation by the detection means according to a preferred embodiment of the invention.

In FIG. 9 a processing scheme for inferring speckle translation and direction. The amount of ball rotation could according to this solution be inferred by counting the number of "zero crossings" for the high-pass filtered signal from one of the detectors. The digital processing scheme according to FIG. 9 is applied in order to provide a robust determination not only of the direction of movement but also for the actual speckle displacement. The dedicated digital processor shown in FIG. 10 is for one direction. The two signals from the two detectors are called A and B. The two signals, Y and X are derived from A and B by logically AND and OR gates, respectively, as shown above in FIG. 10. Four "D-flip-flops" are connected in a way that will provide for "count up" in output $A_3$, and "count down" in output $B_3$. Each of the four "D-flip-flops" will transmit the state of the D-input when the input marked ↑ goes high. The output will exist until a reset pulse is received (R-input goes to zero) or the input marked ↑ goes high again transmitting the new D-input.

The analogue signal from the four detectors is amplified and high-pass filtered and subsequently digitised with a Schmitt trigger. Included in this trigger is a small amount of hysteresis to exclude detection of false zero-crossings.

In FIG. 10 another part of the processing scheme in FIG. 9 is presented. The signal from the detector 15 is enhanced and clamped to a steady DC-level in the unit 200.

In the "rise-and-fall" detector unit 202 a rising signal will result in a voltage of the condensator C2 that is higher than the condensator C1. The upper trigger level of the comperator 203 and that the output of the comperator goes "high", enables AND1 for laser syncronization. C1 will then through the diode D1 follow the change of voltage of C2 upward with a certain difference in voltage. When the signal drops C1 will remain at its already highest obtained voltage until C2 is a certain amount under this voltage level. When the latter has occured the lower trigger level of the comperator 203 and the output thereof goes "low". This enables AND2 and C1 through the diode D2 to follow the change of voltage of C2 downward with a certain difference. The result of this signal processing is that a rising voltage signal is converted to a "high" signal and a falling voltage signal is converted to a "low" signal. This ensures an immunity towards noise in the signals having a low signal/noise relation.

It is realised by the invention that as an alternative to a computer pen as described above, the scope of the invention, as defined in the claims, may also be applied in connection with the construction of other types of input devices, such as track balls or traditional computer mice.

What is claimed is:

1. An input device for positioning a cursor on a computer screen, the device comprising:
   a ball adapted to move on a substrate;
   optical detection means for detecting angular rotation of the ball in two dimensions perpendicular to each other, and transforming the angular rotation of the ball in two perpendicular dimensions into electrical signals;
   wherein said optical detection means comprises
      a first set of detectors adapted to detect an angular rotation in a first of the two perpendicular dimensions, said first set comprising at least two detectors,
      a second set of detectors adapted to detect an angular rotation in a second of the two perpendicular dimensions, said second set comprising at least two detectors, and
      at least one source of substantially coherent electromagnetic radiation communicating with the first and second sets of detectors through a system of lenses, the system of lenses being common to the first and second sets of detectors and the at least one source of coherent electromagnetic radiation, such that light to both the first and second sets of detectors passes through the common system of lenses, and such that light both from the source and to the detectors passes through the common system of lenses.

2. An input device according to claim 1, wherein the optical detection means is adapted to detect a movement of a speckle pattern generated by coherent electromagnetic radiation from the at least one source of coherent electromagnetic radiation scattered from a surface of the ball.

3. An input device according to claim 1, wherein the at least one source of coherent electromagnetic radiation comprises a laser.

4. An input device according to claims 1, wherein each the first and second sets of detectors comprises two detectors arranged such that a change in a speckle pattern on a surface of the ball caused by the angular rotation of the ball is detected by a first detector in one of the first and second sets and then by a second detector in the one of the first and second sets.

5. An input device according to claim 4, wherein a transit time between detected speckles in the speckle pattern is determined by electronic means.

6. An input device according to claim 1, wherein the ball comprises markings on a surface thereof, the markings being optically detectable by the optical detection means.

7. An input device according to claim 6, wherein an area on the surface of the ball that is illuminated by the coherent radiation has a size that is essentially the same as a size of the markings.

8. An input device according to claim 6, wherein the detection means further comprises a collimating lens.

9. An input device according to claim 6, wherein the ball comprises a core, a marking layer comprising markings, a reflection layer, and a protection layer.

10. An input device according to claim 6, wherein the detection means comprise a CCD camera, and wherein the markings of the ball detectable by CCD camera.

11. An input device according to claim 1, wherein the detectors are arranged in an array to enable detection of a relative movement in both direction and distance of a marking on the ball surface with respect to the detection means.

12. An input device according to claim 1, wherein a beam from the at least one electromagnetic radiation source is split into two or more beams.

13. An input device according to claim 1, wherein the ball is comprised of steel.

14. An input device according to claim 1, wherein the device comprises a pressure sensitivity meter for recording a ball pressure.

15. An input device according to claim 1, wherein the device comprises an accelerometer for measuring an acceleration of the device in up to three dimensions.

16. An input device according to claim 1, wherein the device comprises a substantially tubular housing with the ball rotatably disposed at one end thereof.

17. An input device according to claim 1, wherein the input device further comprises an electronic signal processing unit the electrical signals from the optical detection means into signals corresponding to a direction in which the ball rotates.

18. An input device according to claim 1, wherein a focus of the optical detection means is asymmetrically directed towards a surface of the ball.

19. An input device according to claim 1, wherein the angular rotation of the ball is transferred to two shafts, and wherein the optical detection means detect the angular rotation of the ball by detecting an angular rotation of each of the shafts.

20. An input device according to claim 1, wherein the input device further comprises a battery, and battery capacity measuring means for generating and transmitting a signal indicating a remaining capacity of the battery.

21. An input device according to claim 6, wherein the detection means further comprises a diffractive optical element.

22. An input device according to claim 6, wherein the detection means further comprises a circularising lens.

23. An input device according to claim 6, wherein the detection means further comprises a polarising beam splitter.

24. An input device according to claim 6, wherein the detection means further comprises a quarter wave plate.

25. An input device according to claim 11, wherein the detectors are arranged in a quadratic array.

26. An input device according to claims 19, wherein the shafts are arranged perpendicular to each other.

* * * * *